US012334690B2

(12) United States Patent
Pollard

(10) Patent No.: US 12,334,690 B2
(45) Date of Patent: *Jun. 17, 2025

(54) UNIVERSAL POWER CORD HANDLING DEVICE

(71) Applicant: DISH Network L.L.C., Englewood, CO (US)

(72) Inventor: Jimmy A. Pollard, Boiling Springs, SC (US)

(73) Assignee: DISH Network L.L.C., Englewood, CO (US)

( * ) Notice: Subject to any disclaimer, the term of this patent is extended or adjusted under 35 U.S.C. 154(b) by 75 days.

This patent is subject to a terminal disclaimer.

(21) Appl. No.: 18/318,135

(22) Filed: May 16, 2023

(65) Prior Publication Data

US 2023/0291154 A1 Sep. 14, 2023

Related U.S. Application Data

(63) Continuation of application No. 17/143,743, filed on Jan. 7, 2021, now Pat. No. 11,664,632.

(51) Int. Cl.

*H01R 13/72* (2006.01)
*B65H 75/44* (2006.01)
*H01R 13/60* (2006.01)

(52) U.S. Cl.

CPC ......... *H01R 13/72* (2013.01); *B65H 75/4486* (2013.01); *H01R 13/60* (2013.01); *B65H 2701/34* (2013.01)

(58) Field of Classification Search

CPC ...... H01R 13/60; H01R 13/72; B65H 75/446; B65H 2701/34; B65H 54/72; B65H 57/06

See application file for complete search history.

(56) References Cited

U.S. PATENT DOCUMENTS

| | | | | | |
|---|---|---|---|---|---|
| 5,531,333 | A * | 7/1996 | Vara | H01R 13/60 | 242/395 |
| 6,003,804 | A * | 12/1999 | Vara | H02G 11/02 | 242/405 |
| 6,164,582 | A * | 12/2000 | Vara | B65H 75/42 | 242/395 |
| 6,450,436 | B1 | 9/2002 | Tsuji | | |
| 7,189,106 | B2 | 3/2007 | Young | | |
| 8,474,742 | B2 | 7/2013 | Smrha | | |
| 11,664,632 | B2 * | 5/2023 | Pollard | H01R 13/72 | 242/390.8 |

* cited by examiner

*Primary Examiner* — Sang K Kim

(74) *Attorney, Agent, or Firm* — Kilpatrick Townsend & Stockton LLP

(57) ABSTRACT

A power cord handling device and a method to adjust a power cord extending from a device are provided. A frame assembly may include a base supporting a device receiving area to receive a device. A wheel assembly may be adapted to facilitate coiling of a power cord extending from the device when the device is disposed in the device receiving area. The wheel assembly may include a protrusion member. The protrusion member may include one or more slots. A controller may be configured to control a wheel assembly motor. Guide arms may be adapted to receive one or more second portions of the power cord extending from the device and to guide the power cord during a power cord handling operation. The controller may be configured to cause the wheel assembly to perform a power cord handling operation.

20 Claims, 6 Drawing Sheets

UNIVERSAL POWER CORD HANDLING DEVICE

CROSS REFERENCE TO RELATED APPLICATION

This application is a continuation of U.S. Non-Provisional patent application Ser. No. 17/143,743, filed on Jan. 7, 2021, which is incorporated by reference for all purposes.

FIELD

Disclosed embodiments of the present disclosure relate generally to power cords extending from devices, and in particular to power cord handling devices and methods.

BACKGROUND

With the proliferation of electronic devices, one aspect of manufacturing and otherwise servicing such devices is handling the power cords that are attached to many of the devices. Such devices may include, for example, set-top boxes, television receivers, gaming consoles, media devices, appliances, computing devices, and a plethora of other types of electrical/electronic devices that have power cords attached thereto and extending therefrom. There are multiple steps in a process of manufacturing or otherwise servicing the devices that involve power cord handling. Oftentimes, handling power cords is conventionally done by hand or otherwise involves inefficient and non-adaptable means. For example, under conventional work practices, wrapping power cords into coils is performed by hand and may involve wrapping up to 1000 or more power cords per person per day. Several issues are presented by conventional practices, including ergonomic issues such as pain in hands due to overuse and other personal injuries, inefficiencies, and costs. The trend is toward shorter work windows, with a desire for more productivity. So, safer, more ergonomic, and more productive solutions are lacking.

Thus, there is a need to solve these problems and provide for power cord handling devices and methods. These and other needs are addressed by the present disclosure.

BRIEF SUMMARY

Disclosed embodiments of the present disclosure relate generally to power cords extending from devices, and in particular to power cord handling devices and methods.

In one aspect, a power cord handling device to adjust a power cord extending from a device is disclosed. The power cord handling device may include one or a combination of the following. A frame assembly may include a base supporting a device receiving area to receive a device. A wheel assembly may be adapted to facilitate coiling of a power cord extending from the device when the device is disposed in the device receiving area. The wheel assembly may include a protrusion member. The protrusion member may include one or more slots. Each slot of the one or more slots may extends along a longitudinal axis of the protrusion member. Each slot of the one or more slots may be adapted to receive a first portion of the power cord. A wheel assembly motor may be operable to rotate the protrusion member. A controller may be configured to control the wheel assembly motor. Each guide arm of one or more guide arms may include a base portion coupled to the base. Each guide arm of one or more guide arms may include an overhang portion that creates a gap between the overhang portion and the base. Each guide arm of one or more guide arms may be adapted to receive one or more second portions of the power cord extending from the device. Each guide arm of one or more guide arms may be adapted to guide the power cord during a power cord handling operation. When the device is disposed in the device receiving area, the first portion of the power cord is disposed in at least one slot of the one or more slots of the protrusion member, and the one or more second portions of the power cord are disposed under the one or more guide arms, the controller may be configured to cause the wheel assembly to perform a power cord handling operation, where the power cord handling operation causes coiling of the power cord about the protrusion member.

In another aspect, a method of power cord handling to adjust a power cord extending from a device is disclosed. The method may include one or a combination of the following. A frame assembly may be assembled and may support a device receiving area to receive a device. The device receiving area may be supported by a base of the frame assembly. A wheel assembly may be adapted to facilitate coiling of a power cord extending from a device when the device is disposed in a device receiving area. The wheel assembly may include a protrusion member. The protrusion member may include one or more slots. Each slot of the one or more slots may extend along a longitudinal axis of the protrusion member. Each slot of the one or more slots may be adapted to receive a first portion of the power cord. A wheel assembly motor may be adapted to rotate the protrusion member. A controller may be configured to control the wheel assembly motor. One or more guide arms may be adapted to receive one or more second portions of the power cord extending from the device and to guide the power cord during a power cord handling operation. Each guide arm of the one or more guide arms may include a base portion coupled to the base. Each guide arm of the one or more guide arms may include an overhang portion that creates a gap between the overhang portion and the base. The controller may be configured to cause the wheel assembly to perform a power cord handling operation when the device is disposed in the device receiving area, the first portion of the power cord is disposed in at least one slot of the one or more slots of the protrusion member, and the one or more second portions of the power cord are disposed under the one or more guide arms, where the power cord handling operation causes coiling of the power cord about the protrusion member.

In yet another aspect, a method of power cord handling to adjust a power cord extending from a device is disclosed that may include one or a combination of the following. A device may be disposed in a device receiving area. The device receiving area may be supported by a frame assembly, where a power cord extends from the device. A first portion of the power cord may be disposed in at least one slot of one or more slots of a protrusion member. A wheel assembly may include the protrusion member. The protrusion member may include the one or more slots. Each slot of the one or more slots may extend along a longitudinal axis of the protrusion member. Each slot of the one or more slots may be adapted to receive the first portion of the power cord. One or more second portions of the power cord may be disposed under one or more guide arms. The one or more guide arms may be adapted to receive the one or more second portions of the power cord extending from the device and to guide the power cord during a power cord handling operation. Each guide arm of the one or more guide arms may include a base portion coupled to the base. Each guide arm of the one or more guide arms may include an overhang portion that creates a gap between the overhang portion and the base. When the device is disposed in the device receiving area, the first portion of the power cord is disposed in at least one slot of the one or more slots of the protrusion member, and the one or more second portions of the power cord are disposed under the one or more guide arms, activation of a controller may be caused to cause a wheel assembly to perform a power cord handling operation, where the wheel assembly adapted to facilitate coiling of the power cord extending from the device when the device is disposed in the device receiving area, and the power cord handling operation comprises a wheel assembly motor rotating the protrusion member and causing coiling of the power cord about the protrusion member.

In various embodiments, the frame assembly may further include an enclosure that at least partially encloses the wheel assembly motor, that is attached to the base, and that is adapted to support the base. In various embodiments, the device receiving area may be partially bounded by one or more guide members. The one or more guide members may be attached to the base. The one or more guide members may be adapted to at least partially guide the device into the device receiving area. In various embodiments, the wheel assembly may further include a wheel base and a protrusion member that extends from the wheel base. In various embodiments, the protrusion member may define a cavity and may be adapted to receive a plug of the power cord within the cavity when the first portion of the power cord is disposed in at least one slot of the one or more slots of the protrusion member. In various embodiments, the wheel assembly may further include one or more angle members disposed at or near a base portion of the protrusion member, and the one or more angle members may facilitate positioning of the power cord as the wheel assembly winds the power cord about the protrusion member. In various embodiments, the one or more angle members may stop the power cord at a distance above the wheel base when the wheel assembly winds the power cord about the protrusion member.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the following appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Various embodiments according to the present disclosure may provide for universal power cord handling devices and methods that solve problems of conventional power cord handling. Various embodiments may provide for adaptable power cord handling devices and methods that may increase efficiencies, increase safety, and eliminate or mitigate ergonomic issues.

Figure 1:
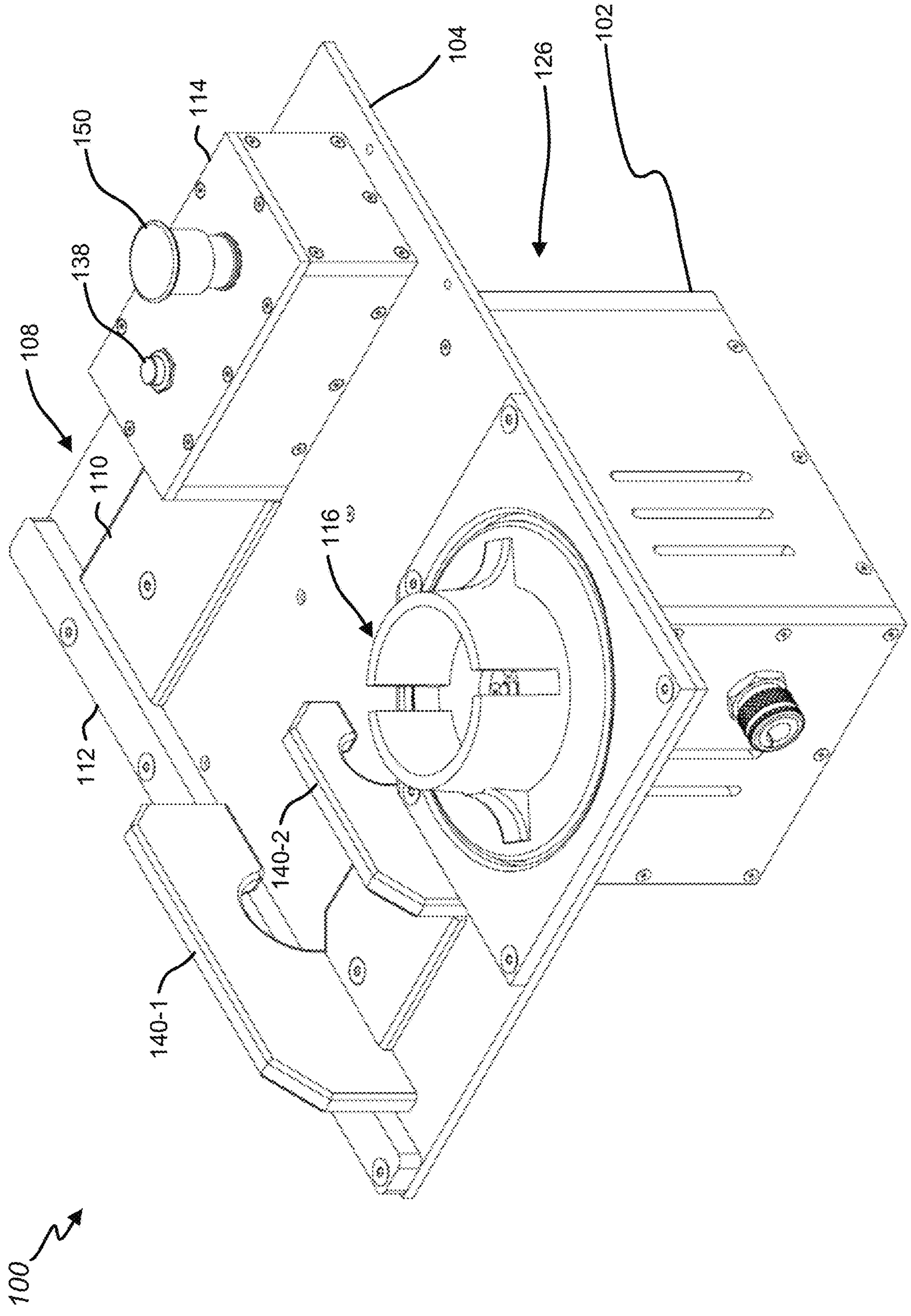
FIG. 1 depicts a perspective view of a universal power cord handling device, in accordance with disclosed embodiments according to the present disclosure.

Various embodiments will now be discussed in greater detail with reference to the accompanying figures, beginning with FIG. 1. FIG. 1 depicts a perspective view of a universal power cord handling device 100, in accordance with disclosed embodiments according to the present disclosure. The power cord handling device 100 may be configured to wind a power cord extending from a device. The power cord handling device 100 may include a rigid frame assembly 126. As depicted, the frame assembly 126 may be an assembly of components.

The power cord handling device 100 may include a motor enclosure 102 and a base 104 attached to the motor enclosure 102. The base 104 may be mounted on the motor enclosure 102. The base 104 may be attached to the motor enclosure 102 in any suitable manner (e.g., fastened with screws or other fasteners) and may be adapted to support other components of the power cord handling device 100 and to provide a work surface in accordance with embodiments disclosed herein. The frame assembly 126 may include the motor enclosure 102 and the base 104. Other frame configurations may be included in other embodiments.

The power cord handling device 100 may be adapted to form a device receiving area 108. In various embodiments, the device receiving area 108 may be adapted to receive a device, such as a set-top box such as a television receiver, a console such as a gaming console, a media device, an appliance, a computing device, and/or any other type of electrical/electronic device which has a power cord attached thereto and extending therefrom. In preparatory operations to facilitate power cord handling, a device may be disposed in the device receiving area 108. The device receiving area 108 may include a support plate 110 adapted to support a device in a predetermined height with respect to the base 104. In some embodiments, the support plate 110 may be adjustable with a quick adjustment mechanism (e.g., a screw adjustment mechanism with a crank, and/or the like) turn to adjust the height of the support plate 110 with respect to the base 104 and, thereby, adjust the height of a device placed in the receiving area 108. The device receiving area 108 may be partially bounded by one or more guide members 112. The guide member 112 may be adapted to provide lateral support, act as a stopper, and/or otherwise guide a device placed in the device receiving area in order to facilitate proper placement of the device in the receiving area and securing of the device during cord handling operations. In some embodiments, the guide member 112 may be fastened to the base 104 in any suitable manner. In some embodiments, the guide member 112 may include an adjustment mechanism to adjust the distance between the guide member 112 and one or more other components of on the base 104 (e.g., the control enclosure 114). For example, some embodiments of the guide member 112 may include one or more adjustable components that may be laterally spring-loaded in order to contact device when the device is placed in the receiving area 104 in order to provide lateral support to secure the device in the receiving area 104, where the lateral support forces are directed toward the control enclosure 104 two secure the device against the control enclosure 114. Thus, the one or more adjustable components may engage the device when the device is placed in the device receiving area 108 (e.g., by way of pushing the device against the one or more adjustable components), with the one or more spring-loaded adjustable components thereafter maintaining contact with the device by force of the spring force(s) until the device is removed from the device receiving area 108. Accordingly, the device receiving area 108 may adapt to handle and secure different types of devices with varying dimensions. Once the device is disposed in the device receiving area 108, the device may be in a ready state for power cord handling operations.

Figure 2A:
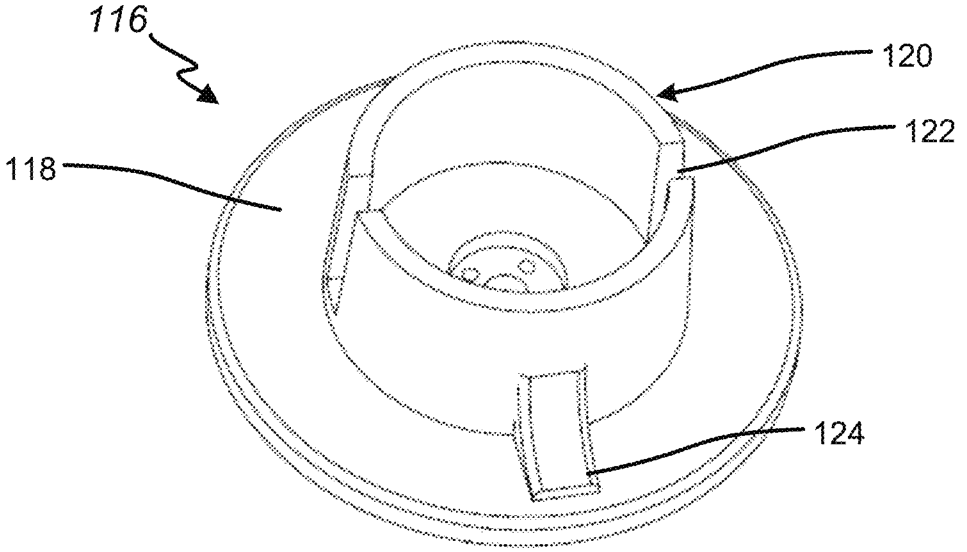
FIG. 2A depicts a perspective view of the wheel assembly, in accordance with disclosed embodiments according to the present disclosure.
Figure 2B:
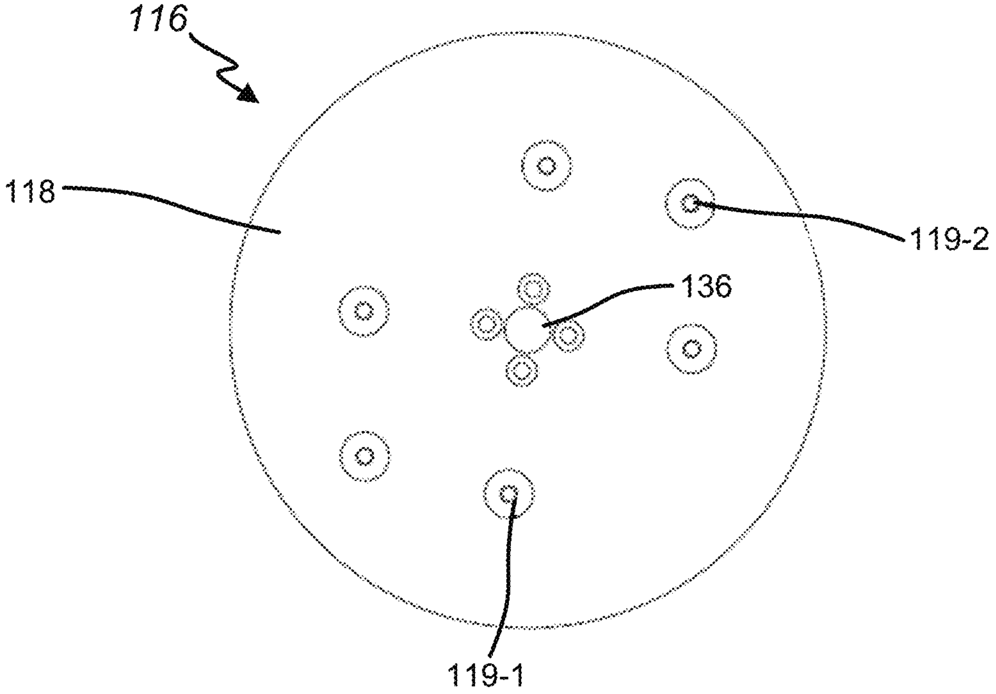
FIG. 2B depicts a bottom view of the wheel assembly, in accordance with disclosed embodiments according to the present disclosure.

The power cord handling device 100 may include a wheel assembly 116. The wheel assembly 116 may be positioned generally opposite the device receiving area 108 with respect to the base 104 in some embodiments. FIG. 2A depicts a perspective view of the wheel assembly 116, in accordance with disclosed embodiments according to the present disclosure. FIG. 2B depicts a bottom view of the wheel assembly 116, in accordance with disclosed embodiments according to the present disclosure.

The wheel assembly 116 may be adapted to facilitate coiling of a power cord. The wheel assembly 116 may include a wheel base 118 and a protrusion member 120 that extends from the wheel base 118. In some embodiments, the wheel base 118 and the protrusion member 120 may be integrally formed as a single piece. In some embodiments, the wheel base 118 and the protrusion member 120 may be separate components where the protrusion member 120 is attached to the wheel base 118 in any suitable manner. For example, as illustrated in the non-limiting embodiment of FIG. 2B, the wheel base 118 may include holes 119-1, 119-2 for fasteners of any suitable type (e.g., screws and/or the like) to fasten the protrusion member 120 and one or more angle members 124, respectively, to the wheel base 118.

Figure 4A:
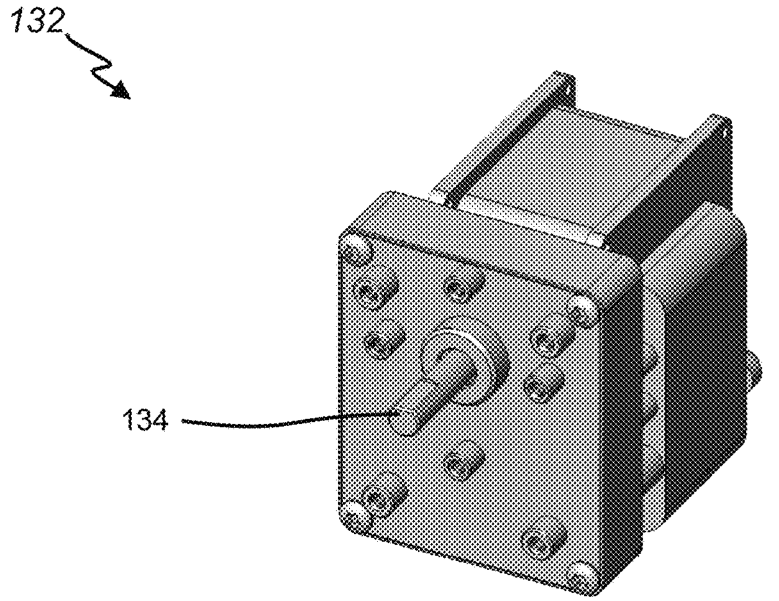
FIG. 4A illustrates one non-limiting example of a wheel assembly motor, in accordance with certain embodiments according to the present disclosure.
Figure 4B:
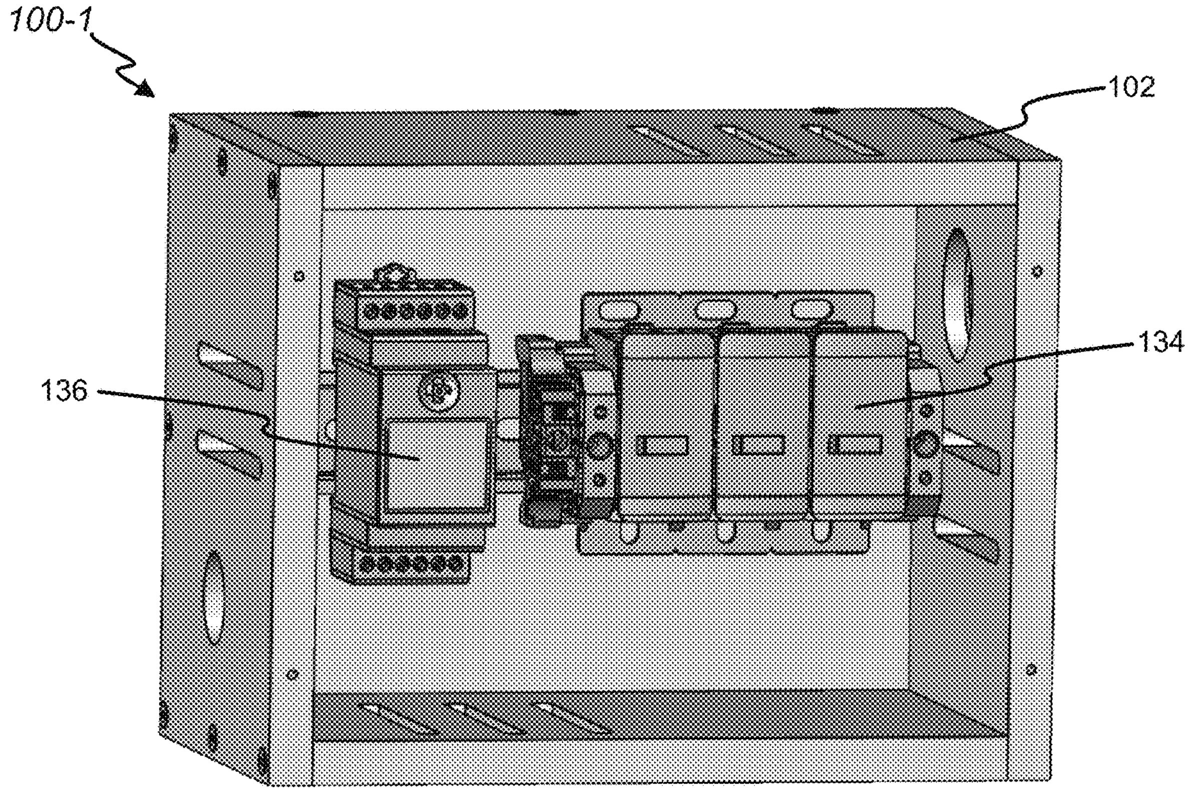
FIG. 4B illustrates one non-limiting example of an exposed motor enclosure with the mounted wheel assembly motor, in accordance with certain embodiments according to the present disclosure.

The wheel assembly 116 may include a wheel assembly motor 132 adapted to rotate the protrusion member 120, e.g., by way of the wheel base 118 in some embodiments. FIG. 4A illustrates one non-limiting example of a wheel assembly motor 132, in accordance with certain embodiments according to the present disclosure. The wheel assembly motor 132 may be axially coupled with the protrusion member 120. The axle 134 of the wheel assembly motor 132 may extend into aperture 136 of the wheel base 118 and may be fastened thereto in any suitable manner (e.g., fastener, mating/interlocking connection, and/or the like). The wheel assembly motor 132 may mounted under the base 104 and in the motor enclosure 102. FIG. 4B illustrates one non-limiting example of an exposed motor enclosure 102 with the mounted wheel assembly motor 132, in accordance with certain embodiments according to the present disclosure. For example, the wheel assembly motor 132 may be attached to the motor enclosure 102 via a bus bar and/or the like.

A control unit 136 (also referenced herein as "controller" and/or "control system") may be configured to control the wheel assembly motor 132 as a function of one or a combination of time, revolutions per second, and/or power cord length. For example, once a winding operation of the wheel assembly motor 132 has been initiated (e.g., via activation of a start switch/button 138) the control unit 136 may control the wheel assembly motor 132 to turn the protrusion member 120 for a certain duration that based at least in part on the revolutions per second of the operating setting of the wheel assembly motor 132 and a certain length, and/or until a certain tension threshold is detected. In some embodiments, the control unit 136 may include a timer relay (e.g., a dual-channel rail mounted multifunction timer relay and/or the like) that may be configured as a basis for time-limiting each winding operation of the wheel assembly motor 132. For example, the timer relay may be set for a duration that ends before the wheel assembly motor 132 would cause the power cord to be jerked by the wheel assembly 116. In some embodiments, multiple durations may be used for a single winding operation. For example, the timer relay may be set for an initial duration that the control unit 136 uses to control the wheel assembly motor 132 to turn the wheel assembly 116 at a higher rate of speed and/or torque, and then subsequent duration that the control unit 136 uses to ramp down the wheel assembly motor 132 to turn the wheel assembly 116 at a lower and/or decreasing rate of speed and/or torque in order to avoid jerking the power cord.

Additionally or alternatively, the tension of the power cord may be detected during the winding operation. In some embodiments, the control unit 136 may detect the tension on the power cord by way of a load sensor. In some embodiments, a load sensor may be included in or communicatively coupled with the wheel assembly motor 132 and configured to detect an operating load of the wheel assembly motor 132 during winding operations. When a threshold load (e.g., resistance) is detected, the control unit 136 and/or the wheel assembly motor 132 may cause the wheel assembly motor 132 to transition to a different operational setting (e.g., a lower speed and/or torque, or a stop). In some embodiments, an initial threshold load detection may correspond to a transition to a first operational setting transition (e.g., to a lower speed and/or torque), and a subsequent threshold load detection may correspond to a transition to a first operational setting transition (e.g., a stop).

Additionally or alternatively, in some embodiments, the wheel assembly motor 132 may be sized to stop under a threshold load condition. For example, the wheel assembly motor 132 may include a lower-power motor (e.g., a quarter of a power rating) that may be stopped under loads that are less than that which would cause jerking of the power cord and/or damage to the power cord and/or device. Accordingly, even if a timer of the control unit 136 has not yet timed out during a winding operation, the wheel assembly motor 132 may safely stop winding while keeping the power cord tight.

Referring again more particularly to FIGS. 2A and 2B, the wheel base 118 may have various dimensions and forms in various embodiments. For example, some embodiments may have a wheelbase 118 that has a flange-like form, while other embodiments may have different shapes and forms. Some embodiments of the wheelbase 118 may extend further outward from the central, rotational axis, while other embodiments may have minimal lateral extension or no lateral extension beyond the bottom of the protrusion member 120. With some embodiments, the bottom of the protrusion member 120 may function at the wheelbase 118, such that no additional wheelbase 118 is included in the power cord handling device 100.

In some embodiments, the protrusion member 120 may have a generally circular and/or cylindrical form as in the illustrated example. In some embodiments, the protrusion member 120 may form a hollow interior cavity is in the illustrated example. However, other embodiments may have other forms. In some embodiments, the protrusion member 120 may be formed as a single piece. For example, some embodiments of the protrusion member 120 may have a different exterior shape, such as a triangular, square, or other polygonal exterior shape instead of the generally circular exterior shape depicted. As another example, some embodiments of the protrusion member 120 may not form a hollow interior cavity but may instead have a solid or generally solid interior. Still further, some embodiments of the protrusion member 120 may not be formed as a single piece but may include multiple pieces. With a multi-piece protrusion member 120, the depicted example of the protrusion member 120 may be formed with true or more pieces abutting together. A multi-piece protrusion member 120 may allow for adjustability of the protrusion member to adapt to different diameters or other distances spanning from one side of the protrusion member to the other. This adaptability to different distances may be further facilitated by the protrusion member 120 pieces being adjustably or otherwise movably attached to the wheel base 118 (e.g., with fastener and slot attachment, login slot attachment, and or the like). The attachments of the protrusion member 120 pieces to the wheel base 118 may be quickly loosened, unlocked, and/or unfastened to allow for the adjustment of the positioning of the protrusion member 120 pieces and then subsequent tightening, locking, and/or fastening of the attachments of the protrusion member 120 pieces to the wheel base 118. In various embodiments, the protrusion member 120 pieces may be hingedly or pivotably attached to the wheel base 118 to allow for quick adjustment of the taper angle of the exterior surfaces of the protrusion member 120 pieces, where the positioning of the protrusion member 120 pieces may maintained by a threaded coupling (e.g., a bolt and sleeve coupling, turnbuckle coupling, and/or the like) coupling the pieces (e.g., attached near the top of the pieces and spanning the distance between the multiple pieces) and may be adjusted by adjusting the threaded coupling.

In some embodiments, the exterior of the protrusion member 120 may be formed to have a slight taper as in the example depicted. For example, the tapered exterior may have a 4° angle as in the illustrated example. However, other embodiments may have different angles on the exterior of the protrusion member 120. The tapered exterior may facilitate coiling of a power cord about the protrusion member 120 and easy removal of the coiled power cord from the protrusion member 120 after the winding process has been performed such that the coiled power cord may be more easily removed from the protrusion member 120 than if there were no taper. Once the coiled power cord is removed from the protrusion member 120 (and the guide arms 140), the coiled power cord may be fastened (e.g., with a wire-tie machine). Further, the tapered exterior may facilitate quasi-concentric coiling of the power cord about the protrusion member 120. When the protrusion member 120 turns, the power cord may be coiled upwardly, e.g., in a upward spiral that may in some embodiments be of decreasing radial distance from the rotational axis and may in some embodiments be of uniform radial distance from the rotational axis.

The protrusion member 120, whether formed as a single piece or adapted as a multi-piece configuration, may include one or more slots 122. The depicted example shows two slots 122. The slots 122 may be formed to extend along a longitudinal axis of the protrusion member 120. Each slot 122 may be adapted to receive a power cord within the slot 122. In operation, the power cord may be disposed in the slot such that the plug of the power cord is positioned within the cavity formed by the protrusion member 120. Thus, even with embodiments where the protrusion member 120 is generally solid, one or more slots 122 may be formed within the protrusion member to receive a power cord and one or more spaces on the interior of the protrusion member 120 may be adapted to receive the head/plug of the power cord. Once the power cord is positioned within a slot 122 (e.g., at the bottom of the slot 122) with the plug on the interior of the protrusion member 120, subsequent lending operations may be performed with the winder assembly 116. The slots 122 may be formed so that the bottom of the slots 122 facilitate an initial positioning of the end portion of the power cord near the plug of the power cord. The bottom of the slots 122 may be at a predetermined height above the wheel base 118 and with respect to one or more angle members 124 in order to position the end portion of the power cord and other portions of the power cord so that the power cord is disposed on a portion of one or more angle members 124 when the wheel assembly 116 winds the power cord about the protrusion member 120. The height of the bottom of the slots 122 and the curvatures and/or angles of the angle members 124 may be adapted to guide the power cord so that, when the wheel assembly 116 winds the power cord about the protrusion member 120, a spacing between the bottom of the coiled cord and the wheel base 118 is created. The space (e.g., about a half inch) may facilitate removal of the coiled power cord by allowing for finger placement under the coiled power cord. Further, height of the bottom of the slots 122 and the curvatures and/or angles of the angle members 124 may be adapted to facilitate upward spiraling coiling of the power cord as the wheel assembly 116 winds the power cord about the protrusion member 120.

The slots 122 may have various shapes in various embodiments. In some embodiments, as in the depicted examples, the slots 122 may have a generally rectangular shape. In some embodiments, the slots 122 may have longitudinal sides that taper such that the tops of the slots 122 (i.e., open ends of the slots 122) may form wider gaps than the bottoms of the slots 122. Accordingly, the slots 122 may flare out in some embodiments. Further, in some embodiments, the slots 122 may have a V shape. Other embodiments are possible, such as the slots 122 being formed to have parabolic shapes. The decreasing gaps from top to bottom of the slots 122 may facilitate greater securement to the power cord when the power cord is disposed within the slots 122 and toward the bottom of the slots 122. Additionally, the decreasing gaps may further allow for adaptability to varying gauges of power cords to accommodate the differences in sizes that may be utilized with the power cord handling device 100.

The power cord handling device 100, including the frame assembly 126, may be fabricated to possess material strength and overall structural strength to generate and accommodate the forces involved with disposing devices in the device receiving area 108, disposing power cords in the guide arms 140 and wheel assembly 116, and performing other cord handling operations in accordance with embodiments disclosed herein. The various components of the power cord handling device 100 may be formed of any suitable material. Materials of various components may include alloy steels with any suitable carbon content, a polymer-based material, a plastic material, such as a synthetic or semi-synthetic organic material, a nylon-based material, etc. sufficiently structurally sound to form a rigid or semi-rigid components.

Figure 3A:
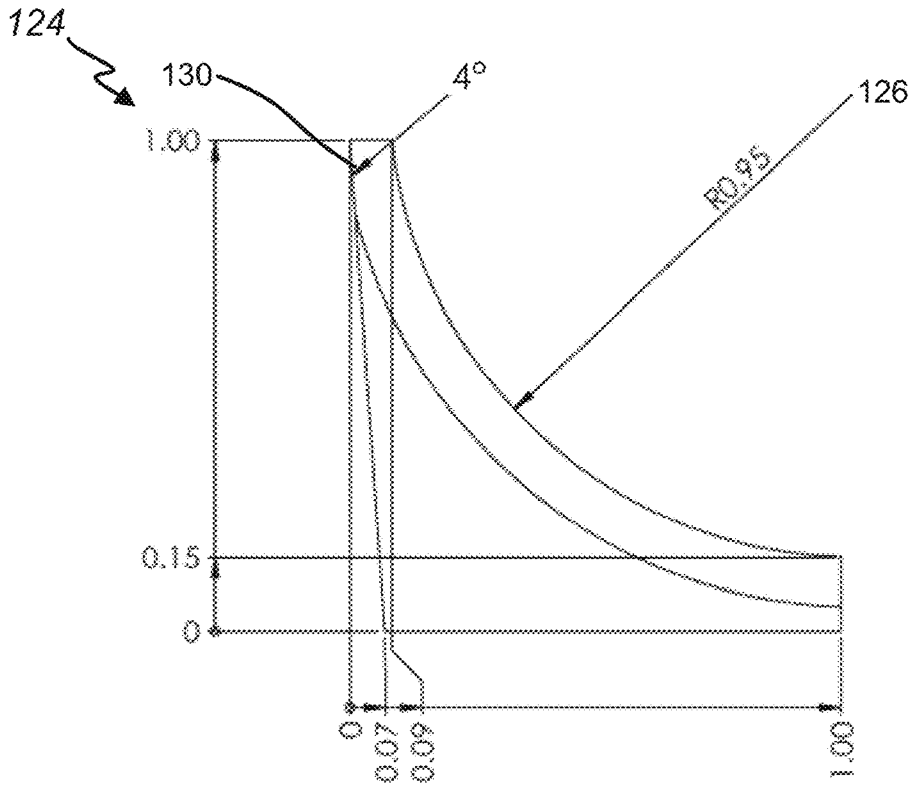
FIG. 3A depicts a side view of an angle member, in accordance with disclosed embodiments according to the present disclosure.
Figure 3B:
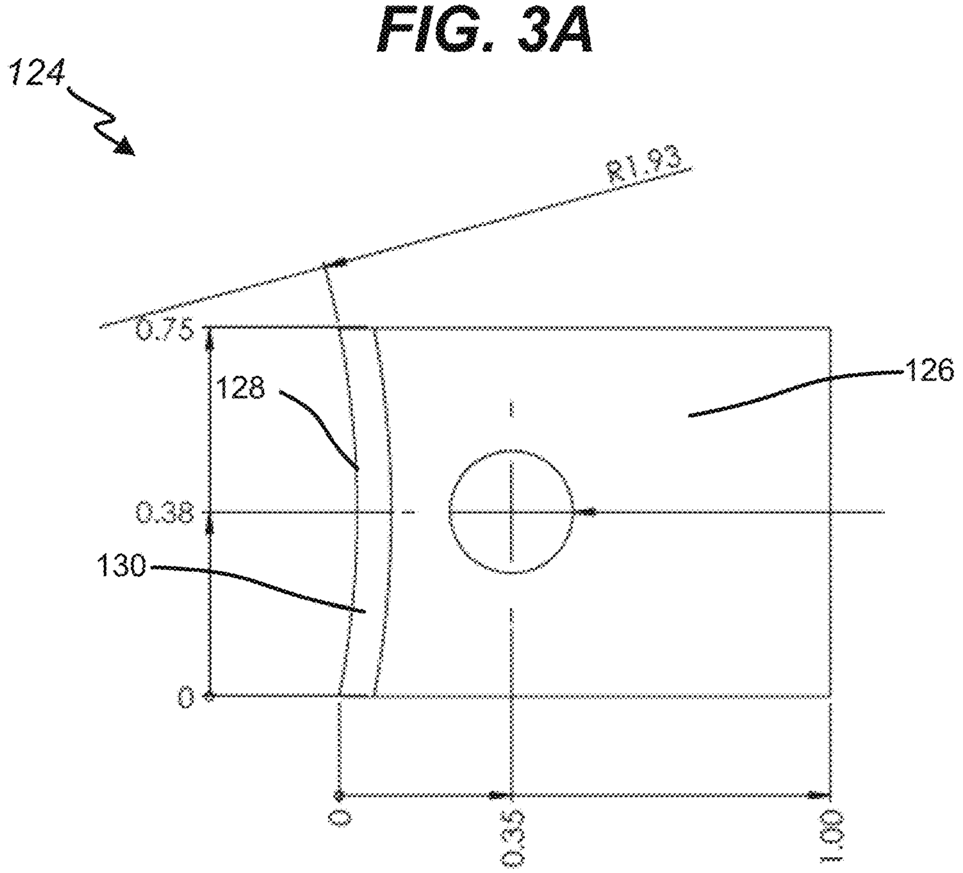
FIG. 3B depicts a bottom view of the angle member, in accordance with disclosed embodiments according to the present disclosure.

The wheel assembly 116 may include one or more angle members 124. FIG. 3A depicts a side view of an angle member 124, in accordance with disclosed embodiments according to the present disclosure. FIG. 3B depicts a bottom view of the angle member 124, in accordance with disclosed embodiments according to the present disclosure. In various embodiments, the one or more angle members 124 may be formed integrally with the protrusion member 120 and/or the wheel base 118. In other embodiments, the one or more angle members 124 may be separate components that may be attached to the protrusion member 120 and/or the wheel base 118 in any suitable manner.

The one or more angle members 124 may function to facilitate positioning of the power cord as the wheel assembly 116 winds the power cord about the protrusion member 120. For example, as disclosed herein, the angle members 124 and the slots 122 may cooperate to create a spacing between the bottom of the coiled power cord and the wheel base 118 when the wheel assembly 116 winds the power cord to facilitate removal of the coiled power cord. Thus, one function of the angle members 124 may be to stop the coiling power cord at a distance above the wheel base 118. Additionally or alternatively, the angle members 124 and the slots 122 may cooperate to facilitate upwardly spiraled coiling of the power cord when the wheel assembly 116 winds the power cord. Thus, one function of the angle members 124 may be to guide radial positioning of the coiling power cord at spiraling or otherwise decreasing radial distances from the rotational axis of the wheel assembly 116 as the wheel assembly 116 winds the power cord. Additionally or alternatively, the one or more angle members 124 may function to provide support to the protrusion member 120 in some embodiments.

The figures depict one non-limiting example of the angle member 124. However, other embodiments are possible. Further, the figures indicate non-limiting example measurements (e.g., in inches) of one embodiments, but other embodiments may have other dimensions. The angle member 124 may be formed to have curvature 126 in some embodiments. The curvature 126, along with other dimensions of the angle member 124, may facilitate the functions of the angle member 124. Other embodiments may have a different radius of curvature. Still other embodiments may have a straight ramp instead of the curvature 126. The angle member 126 may include a curvature 128 adapted to abut a curvature of a portion of the protrusion member 120. For example, the curvature 128 may be formed to have a radius that matches the radius of an exterior portion of the protrusion member 120. Similarly, the angle member 126 may include a bevel 130 from top to bottom adapted to abut and match the portion of the protrusion member 120. For example, the bevel 130 may be formed to have an angle that matches the angle of the corresponding portion of the protrusion member 120.

Figure 5A:
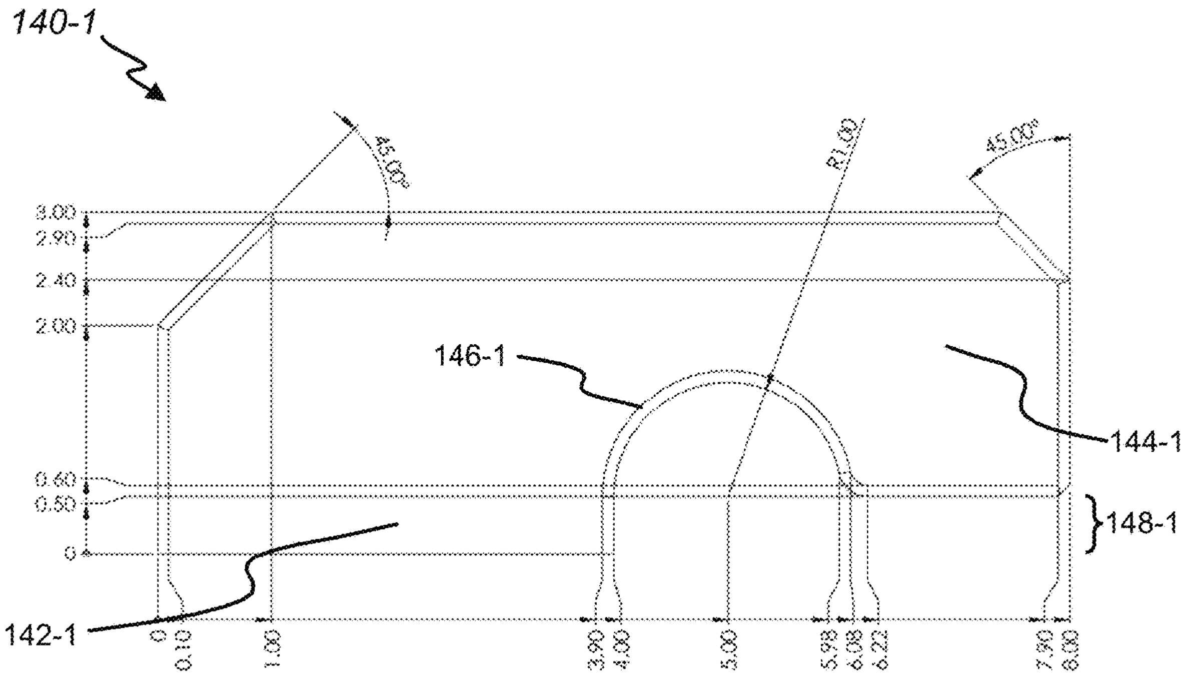
FIG. 5A depicts a side view of the first guide arm, in accordance with disclosed embodiments according to the present disclosure.
Figure 5B:
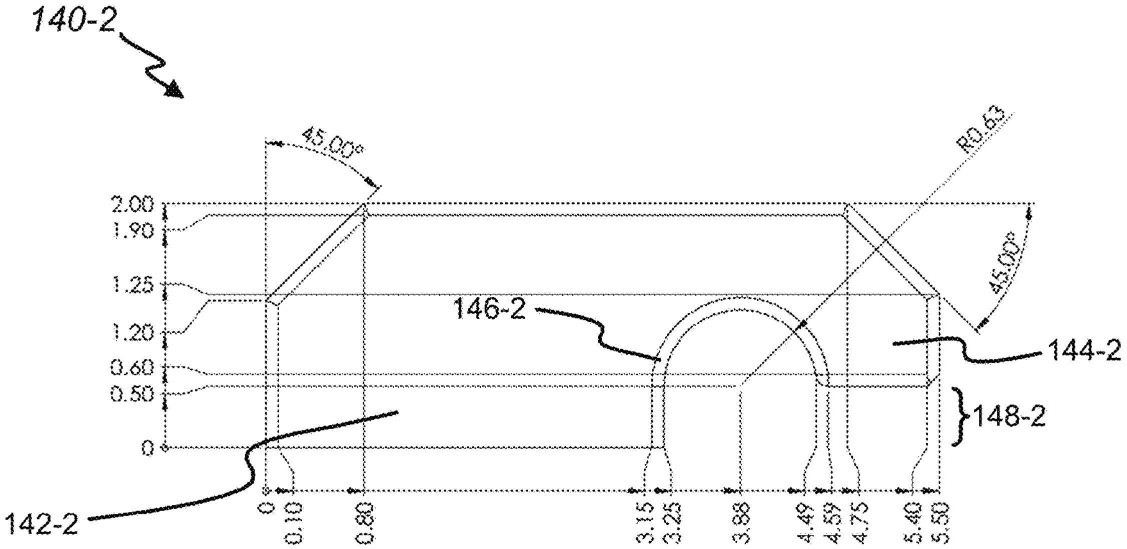
FIG. 5B depicts a bottom view of the secondary guide arm, in accordance with disclosed embodiments according to the present disclosure.

In various embodiments, the power cord handling device 100 may include one or more guide arms 140. The one or more guide arms 140 may be adapted to cooperatively guide a power cord during a winding operation. In some embodiments, the one or more guide arms 140 may include a first guide arm 140-1 and a second guide arm 140-2. In some embodiments, the first guide arm 140-1 may correspond to a primary guide arm, and the second guide arm 140-2 may correspond to a secondary guide arm. FIG. 5A depicts a side view of the first guide arm 140-1, in accordance with disclosed embodiments according to the present disclosure. FIG. 5B depicts a bottom view of the secondary guide arm 140-2, in accordance with disclosed embodiments according to the present disclosure. The figures depict non-limiting examples of the guide arms 140. However, other embodiments are possible. Further, the figures indicate non-limiting example measurements (e.g., in inches) of one embodiment, but other embodiments may have other dimensions. In some embodiments, the primary guide arm 140-1 may be larger than the secondary guide arm 140-2. In other embodiments, the guide arms 140 may be the same size.

Each guide arm 140 may include a base portion 142 and an overhang portion 144. The first guide arm 140-1 and the second guide arm 140-2 may be attached to the base 104 via the base portions 142 of the guide arms 140 in any suitable manner. In some embodiments, the guide arms 140 may be fixedly fastened to the base 104. In some embodiments, the guide arms 140 may be adjustably attached to the base 104 (e.g., via a spring-loaded pivot hinge and an offset male insert stud/extension, and/or the like) to allow for quick adjustment. For example, the guide arms 140 may be lifted a distance from the base 104 to disengage the offset male insert from the base 104 and rotated about a pivot point 180 degrees and lowered to the base 104 to engage the base 104 with the offset male insert and thereby provide an alternative configuration (e.g., a left-handed configuration). The guide arms 140 may be arranged in a parallel configuration where the guide arms 140 are spaced from one another at any suitable distance (e.g., several inches as illustrated).

The overhang portion 144 may define a downward-facing depression 146. The depression 146 may correspond to a curvature in some embodiments. However, in other embodiments, the depression 146 may have other geometries (e.g., a rectangular slot, a V-shaped slot, and/or the like). The geometry of each overhang portion 144 with respect to the corresponding base portion 142 of a guide arm 140 may create a gap 148 between the overhang portion 144 and the base 104 when the guide arm 140 is mounted on the base 104. The gap 148 may allow for power cords to be moved via the gap 148 into the area under the depression 146.

Accordingly, the gaps 148 may be sized to be larger than a range of power cord diameters.

After a power cord has been disposed under the depressions 146 of the guide arms 140, the guide arms 140 may prevent, mitigate, or otherwise limit flopping and excessive movement of the power cord when the power cord is undergoing a winding operation. The rounded edges of the guide arms 140 in the shape of the depression 146 may be adapted to allow for some freedom of movement of the power cord during the winding operation while preventing, mitigating, or otherwise limiting flopping excessive movement of the power cord. Further, in some embodiments, the guide arms may be positioned on the base 104 at an angle (e.g., more or less a right angle, or another suitable angle) with respect to the device receiving area 108 and the wheel assembly 116 that may facilitate a measure of tautness/tension on the power cord during the winding operation when the power cord contacts one or both of the depressions 146.

Additionally or alternatively, in some embodiments, the guide arms 140 may be positioned slightly lower than the wheel assembly 116 in order to facilitate the winding operation and the measure of tautness on the power cord during the winding operation. Additionally or alternatively, some embodiments of the guide arms 140 may be arranged in offset manner with respect to one another. For example, not only may the guide arms 140 be arranged in a parallel manner along the horizontal plane, but also guide arms 140 may be offset a different heights with respect to one another. As a further example, the secondary guide arm 140-2 may be lower than the primary guide arm 140-1 and/or the wheel assembly 116. This may further facilitate keeping a measure of tension on the power cord during a winding operation in order to prevent lumps or other nonconformities in the coiled power cord. The positioning of the guide arms 140 with respect to one another, the wheel assembly 116, and the device receiving area 108 may be adapted in order to facilitate an automatic removal of the power cord from the guide arms 140 through the gaps 148 at or near the end of a winding operation when there is a measure of tautness on the power cord. Thus, at the end of a winding operation, the uncoiled portion of the power cord may have slid or otherwise moved out from under the guide arms 140 through the gaps 148 and may be more or less disposed in a straight line from the wheel assembly 116 to the device at the device receiving area 108. This may further facilitate easy and quick removal of the device and power cord (with the coiled portion of the power cord easily removed from the wheel assembly 116 as disclosed herein) from the power cord handling device 100 (e.g., after the coiled portion of the power cord is tied within automatic tie machine).

Various embodiments of the car cord handling device 100 may include one or more sensors (e.g., one or a combination of position sensors, measurement sensors, distance sensors, proximity sensors, cameras for optical recognition, image analysis, metrics, and recognition, motion sensors, light sensors, ambient light photo sensors, photodiode photo sensors, optical detectors, photo detectors, color sensors, and/or the like) in order to facilitate power cord handling operations disclosed herein. One or more of the sensors may be attached to any suitable element of the power cord handling device 100 and disposed to capture data indicative of the positioning and/or other characteristics of aspects of the device and/or power cord. By way of example, one or more sensors (e.g., a proximity sensor and/or the like) may detect when a device is placed in the device receiving area 108. Likewise, additionally or alternatively, one or more sensors may be coupled to or disposed near one or both of the guide arms 140 in order to detect when a power cord is present under the overhanging portions 144 and/or under the depressions 146. Additionally or alternatively, one or more sensors may be coupled to or disposed near the protrusion member 120 in order to detect when a power cord has been positioned within the slot 122. Further, one or more sensors may be positioned and configured to detect positioning and/or nonconformities of the power cord as the power cord is coiled with a winding operation. One or more sensors may be disposed on the base 104 and/or otherwise on the device 100 to have various fields of view to detect various features such as positions, surfaces, edges, contours, relative distances, and/or any other suitable indicia of the power cords handled by the device 100. Some embodiments may automatically detect a coil impression (e.g., an image of the coiling power cord) with one or more sensors and operate the control unit 136 may match the detected power cord to match the characteristics of the quote power cord to one or more coil patterns (e.g., reference images) and either continue winding operations when the detected characteristics match the pattern or stop winding operations when a nonconformity is detected. Some embodiments of the control unit 136 may learn and infer positions of power cords based at least in part on the detected positions of the power cords, with sensors having sensor sensitivity within a few thousandths of an inch. Additional disclosed embodiments may utilize such position sensors in conjunction with other types of sensors, such as one or a combination of the sensor types above, to learn and detect positions, tensions, and/or other characteristics of power cords, as well as other aspects described further herein. Some embodiments of the control unit 136 may facilitate one or more learning/training modes. Some embodiments may perform image analysis of image data captured with one or more of the sensors to determine one or more image baselines for properly disposed devices and/or power cords and/or properly coiled power cords. Subsequently captured image data may be correlated to reference images using any suitable power cord and/or device traits for correlation.

Each of the sensors of various embodiments may be communicatively coupled to a receiver of the control unit 136 via wired or wireless communication channels. The sensors, receiver, and/or control unit 136 may include any suitable sensors, controller(s), processor(s), memory, communication interface(s), and other components to facilitate various embodiments disclosed herein. The sensors, receiver, and/or control unit 136 may include any sensor circuitry necessary to facilitate the various embodiments, including without limitation any one or combination of analog-to-digital converter circuitry, multiplexer circuitry, amplification circuitry, signal conditioning/translation circuitry, and/or the like. The data captured by the one or more sensors may be used by the control unit 136 to detect positioning and facilitate system-directed positioning, winding, and extraction operations of the power cord handling device 100.

Sensors and control units may be coupled and connected in a serial, parallel, star, hierarchical, and/or the like topologies and may communicate to the control unit 136 via one or more serial, bus, or wireless protocols and technologies which may include, for example, Wi-Fi, CAN bus, Bluetooth, I2C bus, ZigBee, Z-Wave and/or the like. For instance, one or more sensors and control units may use a ZigBee® communication protocol while one or more other devices communicate with the receiver using a Z-Wave® communication protocol. Other forms of wireless communication may be used by sensors, control units, and the control unit 136. For instance, sensors, control units, and the control unit 136 may be configured to communicate using a wireless local area network, which may use a communication protocol such as 802.11.

In some embodiments, the control unit 136 may store one or more power cord profiles that may include specifications of winding operation control parameters for one or more sets of power cord characteristics, coil patterns, and processes disclosed herein. The profiles may include categories, such as reference image and characteristic data compiled, utilized, and refined via machine learning to facilitate the recognition, characterization, and categorization of devices and power cords disclosed herein. The profiles may include rules for handling the thresholds, different lengths of power cords, operational modes, exceptions, inconsistencies, nonconformities, errors, and/or the like disclosed herein.

Thus, in accordance with various embodiments disclosed herein, a power cord handling method may begin with a device being disposed at the device receiving area 108. In some embodiments, the device may be disposed on the support plate one 10. The device may be between the guide member 112 and the control enclosure 114 in some embodiments. In some embodiments, one or more quick-adjust components of the guide member 112 may be activated to brace the device in the receiving area 108 and against the enclosure 114 and/or another opposing brace that is disposed opposite the guide member 112 across the receiving area 108. In some embodiments, the securement of the device may be automatic with one or more actuators (hydraulic, pneumatic, electrical, etc., in various embodiments) configured to actuate the one or more quick-adjust components to make contact with the device and secure the device and the device receiving area 108. In some embodiments, a sensor (e.g., a weight sensor, a proximity sensor, light sensor, image sensor, and/or the like) may detect when a device is present on the support plate 110 or otherwise in the device receiving area 108 and may send a signal and/or data corresponding to the detection to the control unit 136. Accordingly, some embodiments of the control unit 136 may detect when the device is properly disposed in the device receiving area 108. In some embodiments, the automatic securement features may be actuated in response to the detection of the device.

The head of the power cord may be disposed in the cavity of the protrusion member 120, with the end portion near the head being placed within the slot 122. In some embodiments, a sensor (e.g., a weight sensor, a proximity sensor, light sensor, image sensor, and/or the like) may detect when the plug of the power cord is present within the cavity of the protrusion member 120 and/or when the end portion is present within the slot 122, and may send a signal and/or data corresponding to the detection to the control unit 136. Accordingly, some embodiments of the control unit 136 may detect when an end of a power cord is properly disposed in the protrusion member 120.

Interim portions of the power cord may be disposed under the depressions 146 of the overhang portions 144 of the guide arms 140. In some embodiments, a sensor (e.g., a weight sensor, a proximity sensor, light sensor, image sensor, and/or the like) may detect when the power cord is present under the depressions 146 and may send a signal and/or data corresponding to the detection to the control unit 136. Accordingly, some embodiments of the control unit 136 may detect when the power cord is properly disposed under the depressions 146 of the guide arms 140. The winding operation may be initiated with activation of the start button 138. In some embodiments, the winding operation may be device-initiated. For example, the control unit 136 may initiate a winding operation upon detection of the device being properly disposed and secured in the device receiving area 108 and detection of the power cord being properly disposed in the protrusion member 120 and under the guide arms 140. Upon detection of the device not being properly disposed and secured in the device receiving area 108 and/or detection of the power cord not being properly disposed in the protrusion member 120 and/or under the guide arms 140, the control unit 136 may prevent initiation of the winding operation and/or cause an alert to be surfaced via a user interface (e.g., a display communicatively coupled with the control unit 136). Automatic winding operations may be terminated at any moment upon activation of a stop button 150.

As disclosed herein, the control unit 136 may initiate and control rotation of the wheel assembly motor 132 as a function of one or a combination of time, revolutions per second, and/or power cord length. The control unit 136 may further control rotation of the wheel assembly motor 132 as a function of detection of tension of the power cord during the winding operation. In some embodiments, the control unit may ensure that the power cord is coiled in a uniform manner via comparing captured sensor data of the coiling power cord to reference data (e.g., image detection and recognition by way of comparison to reference images). Upon detection of a nonconformity of the coiling power cord satisfy one or more thresholds (e.g., image correlation/match threshold), the control unit 136 may pause the winding operation and/or cause an alert to be surfaced via a user interface. However, upon detection of completion of a winding operation (e.g., by way of one or combination of time detection, tension detection, image detection, and/or other sensor-based detection), the control unit 136 may terminate the winding operation. With the end of the winding operation, the interim portion of the power cord may be removed automatically as disclosed herein or otherwise from the guide arms 140. The coiled power cord may be removed from the protrusion member 120 and bound with an automated or semi-automated binding machine.

In some embodiments, the control unit 136 may be configured to store recordings in volatile and/or non-volatile memory of one or combination of data regarding instances of winding operations (e.g., logging data for instances, cycles, successful completions, stoppages, alerts, and/or the like), winding control data for instances of winding operations (e.g., timing data, revolutions per second, power cord lengths and/or other characteristics), sensor data for instances of winding operations (e.g., tensions, loads, images, and/or the like), and/or the like. In some embodiments, the control unit 136 may create additional or alternative reporting data based at least in part on one or a combination of such recordings. The additional or alternative reporting data may include summary data, averages, medians, frequencies, and/or the like which may be for certain time periods (e.g., averaged over hours, days, etc.). The control unit 136 may surface the reporting data via a user interface and/or may upload the data via one or more networks to a remote computing device.

In some embodiments, the control unit 136 may be implemented as a microcontroller-based system. The non-volatile memory of the control unit 136 may store operating instructions, and/or operating instructions may be programmed in a read-only memory. Implementation of the techniques, blocks, steps and means disclosed herein may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs) or programmable logic controllers (PLCs), field programmable gate arrays (FPGAs), image processors, controllers, microcontrollers, microprocessors, other electronic units designed to perform the functions described above, and/or a combination thereof.

Figure 6:
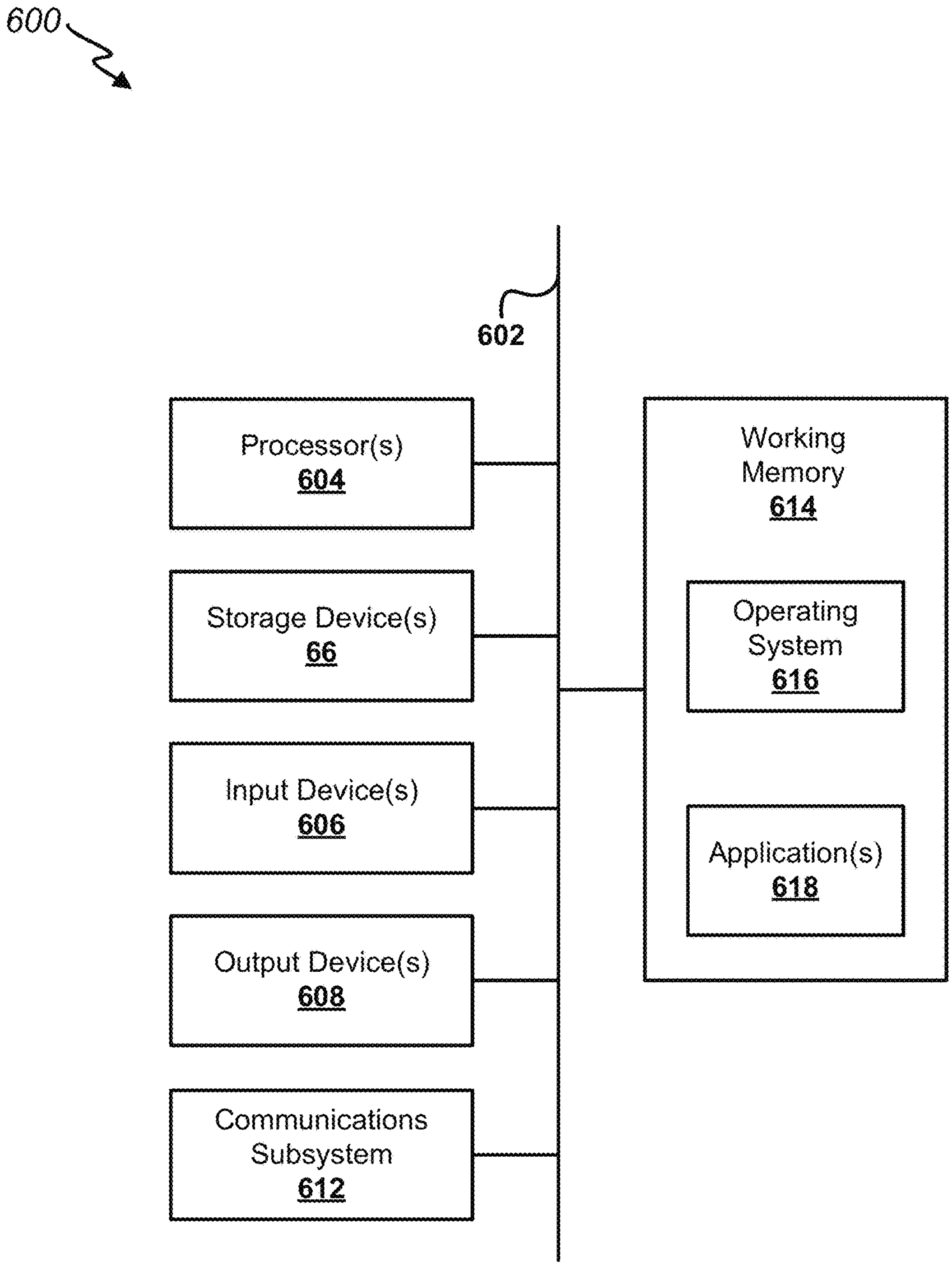
FIG. 6 depicts a block diagram of a special-purpose control system, in accordance with disclosed embodiments according to the present disclosure.

With reference to FIG. 6, an embodiment of a special-purpose control system 600 is shown. In some embodiments, the special-purpose control system 600 may implement the control unit 136. The above methods may be implemented by computer-program products that direct a computer system to perform the actions of the above-described methods and components. In some embodiments, the special-purpose control system 600 may be a computer system. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. Merely by way of example, one or more procedures described with respect to the method(s) discussed herein might be implemented as code and/or instructions executable by a computer (and/or a processor within a computer); in an aspect, then, such code and/or instructions can be used to configure and/or adapt a general purpose computer (or other device) to perform one or more operations in accordance with the described methods, transforming the computer into the special-purpose control system 600.

As discussed further herein, according to a set of embodiments, some or all of the procedures of such methods are performed by the control system 600 in response to processor-execution of one or more sequences of one or more instructions (which might be incorporated into the operating system and/or other code, such as an application program) contained in the working memory. Such instructions may be read into the working memory from another computer-readable medium, such as one or more of the non-transitory storage device(s). Merely by way of example, execution of the sequences of instructions contained in the working memory might cause the processor(s) to perform one or more procedures of the methods described herein.

It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner. The control system 600 is shown comprising hardware elements that can be electrically coupled via a bus 605 (or may otherwise be in communication, as appropriate). The hardware elements may include one or more processors 610, including without limitation one or more general-purpose processors and/or one or more special-purpose processors (such as digital signal processing chips, graphics acceleration processors, video decoders, and/or the like); one or more input devices 615, which can include without limitation a mouse, a keyboard, remote control, and/or the like; and one or more output devices 620, which can include without limitation a display device, a printer, and/or the like.

The control system 600 may further include (and/or be in communication with) one or more non-transitory storage devices 625, which can comprise, without limitation, local and/or network accessible storage, and/or can include, without limitation, a disk drive, a drive array, an optical storage device, a solid-state storage device, such as a random-access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The control system 600 might also include a communications subsystem 630, which can include without limitation a modem, a network card (wireless or wired), an infrared communication device, a wireless communication device, and/or a chipset (such as a Bluetooth™ device, an 802.11 device, a Wi-Fi device, a WiMAX device, cellular communication device, etc.), and/or the like. The communications subsystem 630 may permit data to be exchanged with a network (such as the network described below, to name one example), other computer systems, and/or any other devices described herein. In many embodiments, the control system 600 will further comprise a working memory 635, which can include a RAM or ROM device, as described above.

The control system 600 also can comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 625 described above. In some cases, the storage medium might be incorporated within a computer system, such as control system 600. In other embodiments, the storage medium might be separate from a computer system (e.g., a removable medium, such as a compact disc), and/or provided in an installation package, such that the storage medium can be used to program, configure, and/or adapt a general-purpose computer with the instructions/code stored thereon. These instructions might take the form of executable code, which is executable by the control system 600 and/or might take the form of source and/or installable code, which, upon compilation and/or installation on the control system 600 (e.g., using any of a variety of generally available compilers, installation programs, compression/decompression utilities, etc.), then takes the form of executable code.

As mentioned above, in one aspect, some embodiments may employ a computer system (such as the control system 600) to perform methods in accordance with various embodiments of the invention. According to a set of embodiments, some or all of the procedures of such methods are performed by the control system 600 in response to processor 610 executing one or more sequences of one or more instructions (which might be incorporated into the operating system 640 and/or other code, such as an application program 645) contained in the working memory 635. Such instructions may be read into the working memory 635 from another computer-readable medium, such as one or more of the non-transitory storage device(s) 625. Merely by way of example, execution of the sequences of instructions contained in the working memory 635 might cause the processor(s) 610 to perform one or more procedures of the methods described herein.

The terms "machine-readable medium," "computer-readable storage medium," "computer-readable medium," and that plural forms thereof as used herein, refer to any medium or media that participate in providing data that causes a machine to operate in a specific fashion. These mediums may be non-transitory. In an embodiment implemented using the control system 600, various computer-readable media might be involved in providing instructions/code to processor(s) 610 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 625. Volatile media include, without limitation, dynamic memory, such as the working memory 635.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the control system 600.

The communications subsystem 630 (and/or components thereof) generally will receive signals, and the bus 605 then might carry the signals (and/or the data, instructions, etc. carried by the signals) to the working memory 635, from which the processor(s) 610 retrieves and executes the instructions. The instructions received by the working memory 635 may optionally be stored on a non-transitory storage device 625 either before or after execution by the processor(s) 610.

It should further be understood that the components of control system 600 can be distributed across a network. For example, some processing may be performed in one location using a first processor while other processing may be performed by another processor remote from the first processor. Other components of control system 600 may be similarly distributed. As such, control system 600 may be interpreted as a distributed computing system that performs processing in multiple locations. In some instances, control system 600 may be interpreted as a single computing device, such as a distinct laptop, desktop computer, or the like, depending on the context.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, hydraulic, pneumatic, and/or electric control connections, processes, algorithms, structures, and techniques may be shown without unnecessary detail in order to avoid obscuring the embodiments.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine-readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the terms "storage medium," "storage media," "computer-readable medium," "computer-readable media," "processor-readable medium," "processor-readable media," and variations of the term may represent one or more devices for storing data, including read-only memory (ROM), random-access memory (RAM), magnetic RAM, core memory, magnetic disk storage mediums, optical storage mediums, flash memory devices and/or other machine readable mediums for storing information. The terms, computer-readable media, processor-readable media, and variations of the term, include, but are not limited to portable or fixed storage devices, optical storage devices, wireless channels and various other mediums capable of storing, containing or carrying instruction(s) and/or data.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

While the principles of the disclosure have been described above in connection with specific apparatuses and methods, it is to be clearly understood that this description is made only by way of example and not as limitation on the scope of the disclosure. Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Furthermore, while the figures depicting mechanical parts of the embodiments are drawn to scale, it is to be clearly understood as only by way of example and not as limiting the scope of the disclosure.

Also, the terms in the claims have their plain, ordinary meaning unless otherwise explicitly and clearly defined by the patentee. The indefinite articles "a" or "an," as used in the claims, are defined herein to mean one or more than one of the element that the particular article introduces; and subsequent use of the definite article "the" is not intended to negate that meaning. Furthermore, the use of ordinal number terms, such as "first," "second," etc., to clarify different elements in the claims is not intended to impart a particular position in a series, or any other sequential character or order, to the elements to which the ordinal number terms have been applied.

While the principles of the disclosure have been described above in connection with specific apparatuses and methods, it is to be clearly understood that this description is made only by way of example and not as limitation on the scope of the disclosure.

What is claimed:

1. A cord handling device comprising:
- a wheel assembly adapted to facilitate coiling of a cord, where:
  - the wheel assembly comprises one or more slots;
  - each slot of the one or more slots extends along a longitudinal axis of a protrusion member; and
  - each slot of the one or more slots is adapted to receive a first portion of the cord;
- one or more guide arms, where each guide arm of the one or more guide arms:
  - is coupled to a surface of the cord handling device at one end of the guide arm;
  - is adapted to receive one or more second portions of the cord; and
  - is adapted to guide the cord during a cord handling operation;
- where the cord handling device is operable to perform a cord handling operation when the first portion of the cord is disposed in at least one slot of the one or more slots of the protrusion member, and the one or more second portions of the cord are disposed in a gap between part of the one or more guide arms and the surface, where the cord handling operation causes coiling of the cord about the protrusion member.

2. The cord handling device as recited in claim 1, further comprising:
- a frame assembly, the frame assembly comprising a base supporting a device receiving area to receive a device, wherein the cord handling operation is performed when the device is disposed in the device receiving area.

3. The cord handling device as recited in claim 2, wherein the wheel assembly is adapted to facilitate coiling of the cord when the device is disposed in the device receiving area.

4. The cord handling device as recited in claim 2, where:
- the device receiving area is partially bounded by one or more guide members;
- the one or more guide members are attached to the base; and
- the one or more guide members are adapted to at least partially guide the device into the device receiving area.

5. The cord handling device as recited in claim 1, further comprising:
- a wheel assembly motor that is operable to rotate the protrusion member.

6. The cord handling device as recited in claim 5, further comprising:
- a controller configured to control the wheel assembly motor.

7. The cord handling device as recited in claim 1, where each guide arm of the one or more guide arms comprises:
- a base portion coupled to a base; and
- an overhang portion that creates the gap between the overhang portion and the base.

8. A method comprising:
- adapting a wheel assembly to facilitate coiling of a cord, where:
  - the wheel assembly comprises one or more slots;
  - each slot of the one or more slots extends along a longitudinal axis of a protrusion member; and
  - each slot of the one or more slots is adapted to receive a first portion of the cord;
- adapting one or more guide arms to guide the cord during a cord handling operation, where each guide arm of the one or more guide arms:
  - is coupled to a surface of a cord handling device at one end of the guide arm; and
  - is adapted to receive one or more second portions of the cord;
- where the cord handling device is operable to perform a cord handling operation when the first portion of the cord is disposed in at least one slot of the one or more slots of the protrusion member, and the one or more second portions of the cord are disposed in a gap between part of the one or more guide arms and the surface, where the cord handling operation causes coiling of the cord about the protrusion member.

9. The method as recited in claim 8, further comprising:
- assembling a frame assembly, the frame assembly comprising a base supporting a device receiving area to receive a device, wherein the cord handling operation is performed when the device is disposed in the device receiving area.

10. The method as recited in claim 9, wherein the wheel assembly is adapted to facilitate coiling of the cord when the device is disposed in the device receiving area.

11. The method as recited in claim 9, where:
- the device receiving area is partially bounded by one or more guide members;
- the one or more guide members are attached to the base; and the one or more guide members are adapted to at least partially guide the device into the device receiving area.

12. The method as recited in claim 8, further comprising:

adapting a wheel assembly motor to be operable to rotate the protrusion member.

13. The method as recited in claim 12, further comprising:

configuring a controller to control the wheel assembly motor.

14. The method as recited in claim 8, where each guide arm of the one or more guide arms comprises:

a base portion coupled to a base; and an overhang portion that creates the gap between the overhang portion and the base.

15. A method comprising:

disposing a first portion of a cord in at least one slot of one or more slots of a wheel assembly, where each slot of the one or more slots extends along a longitudinal axis of a protrusion member;

disposing one or more second portions of the cord under one or more guide arms to guide the cord during a cord handling operation, where each guide arm of the one or more guide arms is coupled to a surface of a cord handling device at one end of the guide arm; and activating the cord handling device to perform a cord handling operation when the first portion of the cord is disposed in at least one slot of the one or more slots of the protrusion member, and the one or more second portions of the cord are disposed in a gap between part of the one or more guide arms and the surface, where the cord handling operation causes coiling of the cord about the protrusion member.

16. The method as recited in claim 15, further comprising:

disposing a device in a device receiving area, the device receiving area supported by a frame assembly, where the cord extends from the device.

17. The method as recited in claim 16, wherein the wheel assembly is adapted to facilitate coiling of the cord when the device is disposed in the device receiving area.

18. The method as recited in claim 16, where:

the device receiving area is partially bounded by one or more guide members;

the one or more guide members are attached to a base; and the one or more guide members are adapted to at least partially guide the device into the device receiving area.

19. The method as recited in claim 15, where the cord handling device comprises a wheel assembly motor operable to rotate the protrusion member.

20. The method as recited in claim 19, where the cord handling device further comprises a controller to control the wheel assembly motor.

* * * * *